United States Patent
Ketelson et al.

(10) Patent No.: US 12,527,739 B2
(45) Date of Patent: Jan. 20, 2026

(54) AQUEOUS PHARMACEUTICAL COMPOSITIONS COMPRISING BENZYL ATROPINE AND USES THEREOF

(71) Applicant: Alcon Inc., Fribourg (CH)

(72) Inventors: Howard Allen Ketelson, Dallas, TX (US); Rekha Rangarajan, Fort Worth, TX (US)

(73) Assignee: ALCON INC., Fribourg (CH)

( * ) Notice: Subject to any disclaimer, the term of this patent is extended or adjusted under 35 U.S.C. 154(b) by 327 days.

(21) Appl. No.: 18/463,090

(22) Filed: Sep. 7, 2023

(65) Prior Publication Data

US 2024/0099970 A1    Mar. 28, 2024

Related U.S. Application Data

(60) Provisional application No. 63/375,236, filed on Sep. 11, 2022.

(51) Int. Cl.

| | |
|---|---|
| *A61K 9/08* | (2006.01) |
| *A61K 9/00* | (2006.01) |
| *A61K 31/46* | (2006.01) |
| *A61K 47/02* | (2006.01) |
| *A61K 47/10* | (2017.01) |
| *A61K 47/14* | (2017.01) |
| *A61K 47/26* | (2006.01) |
| *A61K 47/40* | (2006.01) |

(52) U.S. Cl.
CPC .............. *A61K 9/08* (2013.01); *A61K 9/0048* (2013.01); *A61K 31/46* (2013.01); *A61K 47/02* (2013.01); *A61K 47/10* (2013.01); *A61K 47/14* (2013.01); *A61K 47/26* (2013.01); *A61K 47/40* (2013.01)

(58) Field of Classification Search
CPC ........ A61K 9/08; A61K 9/0048; A61K 31/46; A61K 47/02; A61K 47/10; A61K 47/14; A61K 47/26; A61K 47/40; A61K 47/44; A61P 27/02; A61P 27/10; C07D 451/10
See application file for complete search history.

(56) References Cited

FOREIGN PATENT DOCUMENTS

WO        2019087146 A1    5/2019

OTHER PUBLICATIONS

Chia, A. et al. "Atropine for the treatment of childhood myopia: safety and efficacy of 0.5%, 0.1%, and 0.01% doses (Atropine for the Treatment of Myopia 2)", Ophthalmology, 2012, 119(2):347-54.
Chia, A. et al. "Five-Year Clinical Trial on Atropine for the Myopia 2, Myopia control with Atropine 0.01% Eyedrops", Ophthalmology 2016, vol. 123, No. 2, 391-399.
Chua et al., "Atropine for the Treatment of Childhood Myopia." Opthalmology. Dec. 2006. vol. 113, No. 12. pp. 2285-2291.
Cooper, J.; et al. Current status on the development and treatment of myopia, Optometry 2012, 83(5), 179-199.
Elliott H. Myrowitz "Juvenile myopia progression, risk factors and interventions", Saudi J Ophthalmol. Jul. 2012; 26(3): 293-297.
Flitcroft D. et al. "IMI—Defining and Classifying Myopia: A Proposed Set of Standards for Clinical and Epidemiologic Studies", IOVS, 2019, 60: M20-M30.
Flitcroft D. I. "The complex interactions of retinal, optical and environmental factors in myopia aetiology", Prog Retin Eye Res 2012, 31 (6), 622-660.
Gilmartin B. "Myopia: precedents for research in the twenty-first century", Clin Exp Ophthalmol, 2004, 32:305-324.
Grosvenor T. "A review and suggested classification of myopia on the basis of age-related prevalence and age of onset" Am J Optom Physiol Opt 1987, 64: 545-54.
Holden et al. "Global Prevalence of Myopia and High Myopia and Temporal Trends from 2000 through 2050", Ophthalmology, May 2016, vol. 123, No. 5, 1036-42.
Huang J. et al. "Efficacy comparison of 16 interventions for myopia control in children: A network meta-analysis", Ophthalmology 2016, 123 (4), 697-708.
Ramke J, et al "Correction of refractive error and presbyopia in Timor-leste" Br J Ophthalmol, 2007, 91(7):860-866.
Saw S-M. "A synopsis of the prevalence rates and environmental risk factors for myopia", Clin Exp Optom, 2003, 86: 289-94.
T. Higuchi et al. "Pro-drugs as Novel Delivery Systems," ACS Symposium Series, vol. 14, 1975, Chapter 1, pp. 1-115.
Yam JC et al. "Low-Concentration Atropine for Myopia Progression (LAMP) Study: A Randomized Double-Blinded Placebo-Controlled Trial of 0.05%, 0.025%, and 0.01% Atropine Eye Drops in Myopia Control", Ophthalmology, 2019, 126(1): 113-124.

*Primary Examiner* — Robert A Wax
*Assistant Examiner* — Quanglong N Truong

(57) ABSTRACT

The present disclosure is directed, in part, to aqueous pharmaceutical solutions comprising benzyl atropine or a pharmaceutically acceptable salt or prodrug thereof, at least one buffer, at least one tonicity agent, and at least one solubilizing agent, processes of preparing an aqueous solution comprising benzyl atropine, the products of such processes, and methods of preventing myopia, treating myopia, reducing myopia progression, or preventing myopia progression in a subject in need thereof, by administering to the eye of the subject a therapeutically effective amount of such an aqueous pharmaceutical solution.

13 Claims, 2 Drawing Sheets

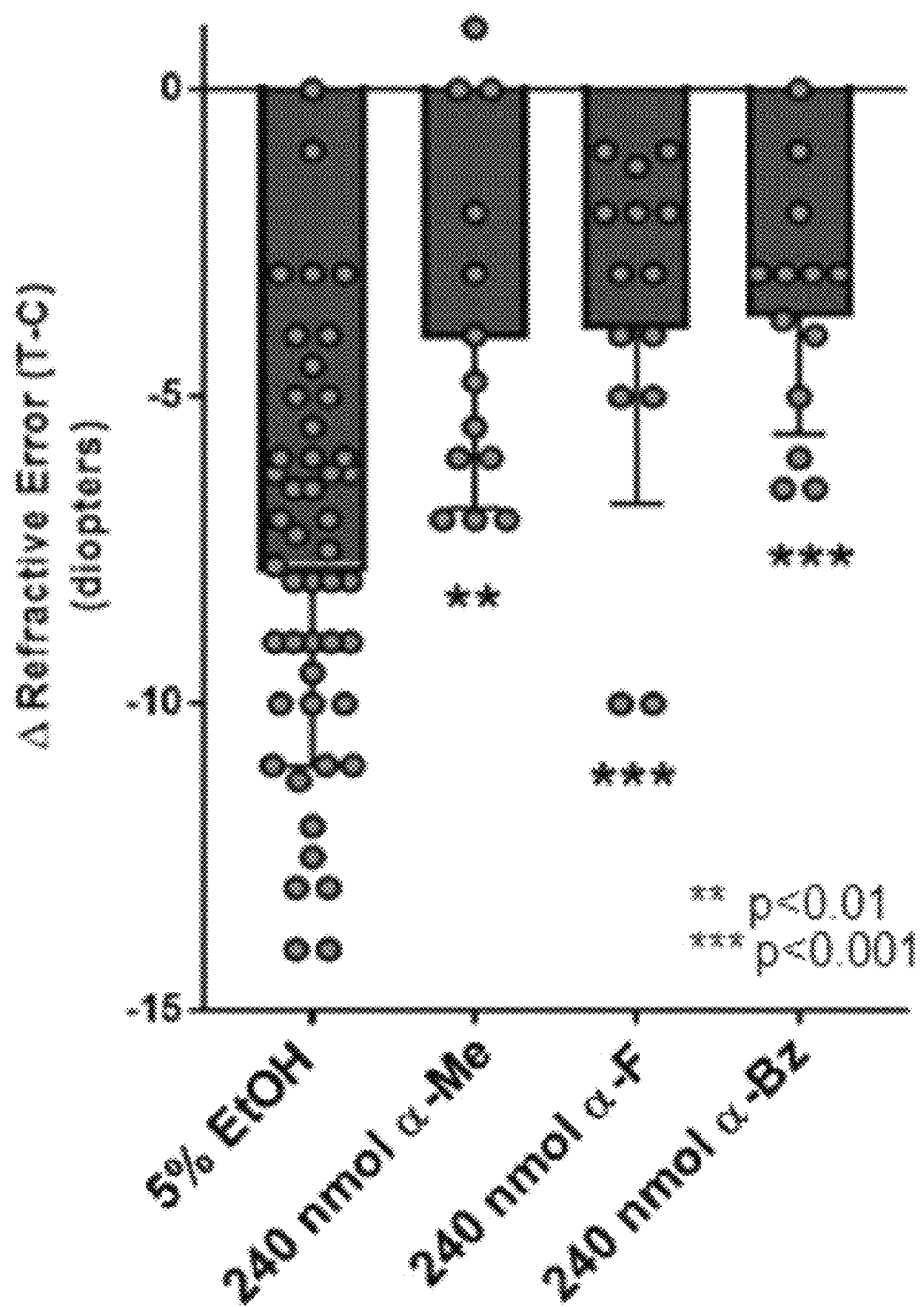

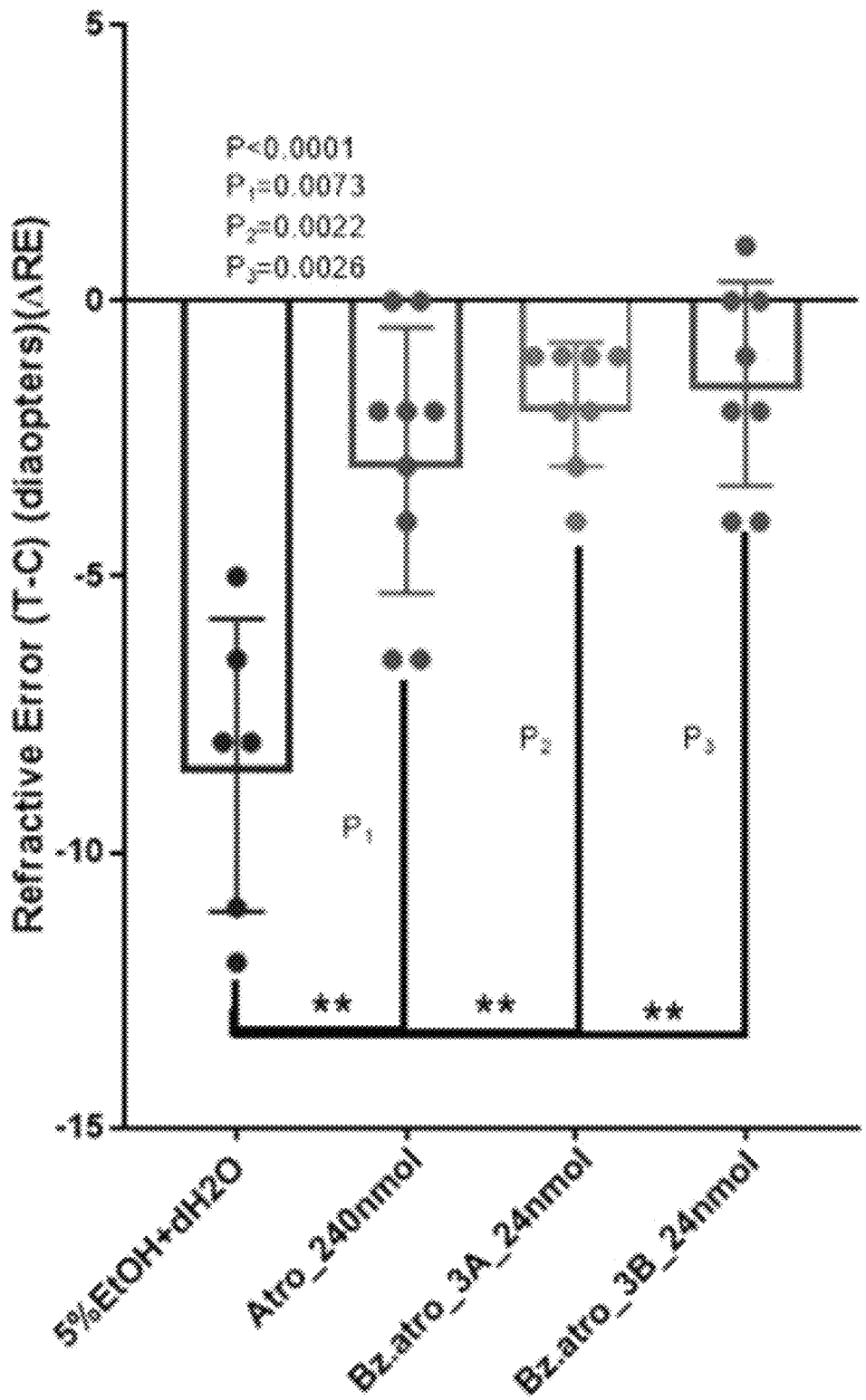
(cont.)

AQUEOUS PHARMACEUTICAL COMPOSITIONS COMPRISING BENZYL ATROPINE AND USES THEREOF

This application claims the benefit under 35 USC § 119(e) of United States provisional application No. 63/375,236 filed 11 Sep. 2022, herein incorporated by reference in its entirety.

FIELD

The present disclosure is directed to compositions comprising benzyl atropine, or pharmaceutically acceptable salts thereof, methods of preparing benzyl atropine compositions, and methods for preventing or treating myopia, reducing myopia progression, or preventing myopia progression by administering benzyl atropine compositions.

BACKGROUND

Myopia is an eye condition sometimes referred to as nearsightedness. For example, myopia may describe a subject who has good near vision but poor distance vision. Technically, myopia is a refractive error in which rays of light entering the eye parallel to the optic axis are brought to focus in front of the retina when ocular accommodation is relaxed. This usually results from the eyeball being too long from front to back but myopia can also be caused by an overly curved cornea and/or lens increased optical power (world wide web at "aoa.org/documents/optometrists/CPG-15").

There are four forms of myopia, each assessed by a determination of the spherical equivalent refractive error (RE) of an eye when ocular accommodation is relaxed. Pre-myopia is a condition in which the spherical equivalent RE is ≤+0.75 diopters (D) and >−0.50D. Myopia is a condition in which the spherical equivalent RE is ≤−0.50D. Low myopia is a condition in which the spherical equivalent RE is ≤−0.50D and >−6.00D. High myopia is a condition in which the spherical equivalent RE is ≤−6.00D.

The prevalence of myopia (nearsightedness) is growing at a fast rate with and is predicted to double by 2050. Additionally, high myopia is often associated with an increased risk for blindness (Holden et al., Ophthalmology, 2016, 123, 1036-42). Current treatments include orthokeratology, the use of multifocal soft contact lenses, the use of progressive eyeglasses, or the uses of bifocal eyeglasses but the effectiveness of such treatments is at best moderate.

Several animal and human studies have assessed different classes of pharmacological agents for their ability to reduce the progression of myopia. Out of these studies, native atropine isolated as a racemic mixture from *Atropa belladonna* has shown great promise in its ability to reduce myopia progression. Several large randomized clinical trials conducted in Asian countries, namely, the ATOM1, ATOM2, and LAMP studies, have examined the effectiveness of native atropine at various dose strengths to reduce myopia progression in children. [ATOM 1: Chua W H et al. *Ophthalmology*. Atropine for the Treatment of Childhood Myopia. 2006. 113: 2285-2291; ATOM 2: Chia, A et al. *Ophthalmology*. Atropine for the treatment of childhood myopia: safety and efficacy of 0.5%, 0.1%, and 0.01% doses (Atropine for the Treatment of Myopia 2). 2012. 119(2): 347-354; LAMP: Yam J C et al. *Ophthalmology*. Low-Concentration Atropine for Myopia Progression (LAMP) Study: A Randomized Double-Blinded Placebo-Controlled Trial of 0.05%, 0.025%, and 0.01% Atropine Eye Drops in Myopia Control. 2019. 126(1): 113-124.] While these clinical studies have demonstrated the effectiveness of native atropine in reducing myopia progression, high doses of native atropine are required. However, these higher doses are associated with debilitating side effects including pupillary dilation and light sensitivity. Additionally, native atropine is inherently unstable in aqueous solutions having physiological pH values. For example, atropine decomposes into tropic acid and tropine in aqueous solutions having neutral pH values. This decomposition makes native atropine nonviable as a pharmacological agent for the treatment of myopia. Accordingly, there is a long felt but unsolved need for pharmacological agents that prevent myopia, treat myopia, reduce myopia progression, or prevent myopia progression where such agents are stable in aqueous solutions having physiological pH values.

SUMMARY

The present disclosure provides aqueous pharmaceutical solutions comprising benzyl atropine of Formula I:

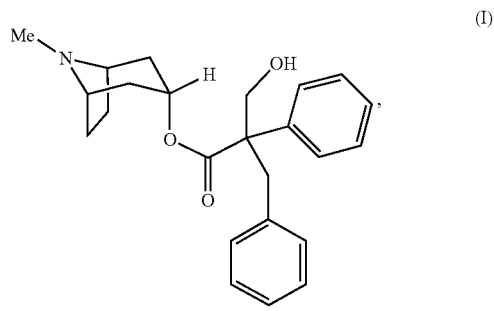 [SMILES: CN1C2CCC1CC(OC(=O)C(CO)(Cc1ccccc1)c1ccccc1)C2]

or a pharmaceutically acceptable salt or prodrug thereof, at least one buffer, at least one tonicity agent, and at least one solubilizing agent. In some embodiments, the concentration of the benzyl atropine or a pharmaceutically acceptable salt or prodrug thereof is from about 0.01 to about 0.2% (wt/wt), and is preferably from about 0.05 to about 0.2% (wt/wt).

The present disclosure also provides processes of preparing an aqueous solution comprising benzyl atropine of Formula I:

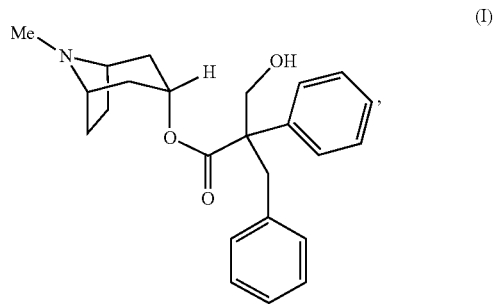 [SMILES: CN1C2CCC1CC(OC(=O)C(CO)(Cc1ccccc1)c1ccccc1)C2]

or a pharmaceutically acceptable salt or prodrug thereof, comprising: providing an aqueous solution comprising at least one acetate buffer, at least one solubilizing agent, and at least one additional solubilizing agent; and adding to the aqueous solution the benzyl atropine or a pharmaceutically acceptable salt or prodrug thereof. In some embodiments, the aqueous solution has a pH value from about 4 to about 5. In some embodiments, the concentration of the benzyl atropine or a pharmaceutically acceptable salt or prodrug thereof in the aqueous solution is from about 0.01 to about 0.2% (wt/wt), and is preferably from about 0.05 to about 0.2% (wt/wt). In some embodiments, the aqueous solution of benzyl atropine or a pharmaceutically acceptable salt or prodrug thereof has a pH value of greater than about 5.

The present disclosure also provides products of a process of preparing an aqueous solution comprising benzyl atropine of Formula I:

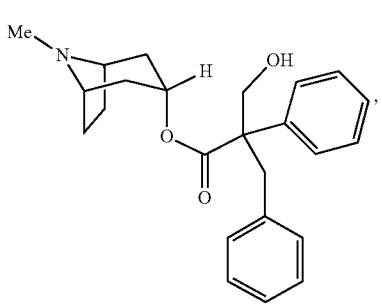

or a pharmaceutically acceptable salt or prodrug thereof comprising: providing an aqueous solution comprising at least one acetate buffer, at least one solubilizing agent, and at least one additional solubilizing agent; and adding to the aqueous solution the benzyl atropine or a pharmaceutically acceptable salt or prodrug thereof. In some embodiments, the aqueous solution has a pH value from about 4 to about 5. In some embodiments, the concentration of the benzyl atropine or a pharmaceutically acceptable salt or prodrug thereof in the aqueous solution is from about 0.01 to about 0.2% (wt/wt) and is preferably from about 0.05 to about 0.2% (wt/wt). In some embodiments, the aqueous solution of benzyl atropine has a pH value of greater than about 5.

The present disclosure also provides methods of preventing myopia, treating myopia, reducing myopia progression, or preventing myopia progression in a subject in need thereof, comprising administering to the eye of the subject a therapeutically effective amount of an aqueous pharmaceutical solution comprising benzyl atropine of Formula I:

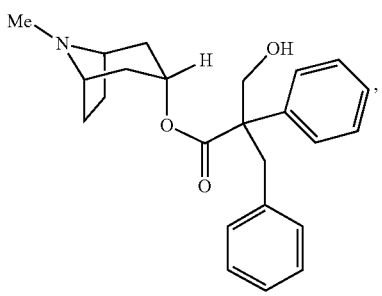

or a pharmaceutically acceptable salt or prodrug thereof, at least one buffer, at least one tonicity agent, and at least one solubilizing agent. In some embodiments, the concentration of the benzyl atropine or a pharmaceutically acceptable salt or prodrug thereof is from about 0.01 to about 0.2% (wt/wt), and is preferably from about 0.05 to about 0.2% (wt/wt).

BRIEF DESCRIPTION OF THE DRAWINGS

The accompanying FIGURES, which are incorporated in and constitute a part of this specification, illustrate several aspects and together with the description serve to explain the principles of the present disclosure.

FIG. 1 shows that in a form deprivation-induced myopia (FDM) in a chick model, synthetic atropine derivatives demonstrated superior efficacy than a myopia control. Panel A shows that the change in refractive error (goggled eye value minus ungoggled eye value) in diopters (abscissa) for methyl atropine ($\alpha$-Me), fluro-atropine ($\alpha$-F), and benzyl atropine ($\alpha$-Bz) was significantly decreased with respect to a 5% v/v ethanol solution (ordinate). Panel B shows that the change in refractive error (goggled eye value minus ungoggled eye) value in diopters (abscissa) observed for 5% v/v ethanol, atropine (Atro_240 nmol; ordinate), and benzyl atropine (Bz.atro_3A_24_nmol and Bz.atro_3B_24_nmol, where 3A and 3B refer to the individual isomers of benzyl atropine) (ordinate).

DESCRIPTION OF EMBODIMENTS

Unless defined otherwise, all technical and scientific terms have the same meaning as is commonly understood by one of ordinary skill in the art to which the disclosed embodiments belong.

As used herein, the terms "a" or "an" mean "at least one" or "one or more" unless the context clearly indicates otherwise.

As used herein, the term "about" means that the recited numerical value is approximate and small variations would not significantly affect the practice of the disclosed embodiments. Where a numerical value is used, unless indicated otherwise by the context, "about" means the numerical value can vary by ±10% and remain within the scope of the disclosed embodiments.

As used herein, the term "animal" includes, but is not limited to, mammals, humans and non-human vertebrates, such as wild, domestic, and farm animals.

As used herein, the terms "antagonize" and "antagonizing" mean reducing or completely eliminating one or more effects.

As used herein, the term "benzyl atropine" means the compound of Formula I, and includes the racemic mixture and isolated enantiomers of the compound of Formula I.

As used herein, the term "carrier" means a diluent, adjuvant, or excipient with which a compound is administered in a composition.

As used herein, the term, "compound" means all stereoisomers, tautomers, isotopes, and polymorphs of the compounds described herein.

As used herein, the terms "comprising" (and any form of comprising, such as "comprise", "comprises", and "comprised"), "having" (and any form of having, such as "have" and "has"), "including" (and any form of including, such as "includes" and "include"), or "containing" (and any form of containing, such as "contains" and "contain"), are inclusive and open-ended and include the options following the terms, and do not exclude additional, unrecited elements or method steps.

As used herein, the term "contacting" means bringing together two compounds, molecules, or entities in an in vitro system or an in vivo system.

As used herein, the terms "individual," "subject," and "patient," used interchangeably, mean any animal described herein.

As used herein, the phrase "in need thereof" means that the "individual," "subject," or "patient" has been identified as having a need for the particular method, prevention, or treatment. In some embodiments, the identification can be by any means of diagnosis. In any of the methods, preventions, and treatments described herein, the "individual," "subject," or "patient" can be in need thereof.

As used herein, the term "integer" means a numerical value that is a whole number. For example, an "integer from 1 to 5" means 1, 2, 3, 4, or 5.

As used herein, the term "isolated" means that the compounds, or pharmaceutically acceptable salts thereof, described herein are separated from other components of either: a) a natural source, such as a plant or cell, such as a bacterial culture, or b) a synthetic organic chemical reaction mixture, such as by conventional techniques.

As used herein, the term "mammal" means a rodent (i.e., a mouse, a rat, or a guinea pig), a monkey, a sheep, a cat, a dog, a cow, a horse, a pig, or a human. In some embodiments, the mammal is a human.

As used herein, "ophthalmically compatible" is art-recognized and refers to formulations, polymers and other materials and/or dosage forms which are suitable for use in contact with the ocular tissues of human beings and animals without excessive toxicity, irritation, allergic response, or other problem or complication, commensurate with a reasonable benefit/risk ratio as determined by one of ordinary skill in the art.

As used herein, a pharmaceutical composition is a composition suitable for pharmaceutical use. A composition suitable for pharmaceutical use may be sterile, homogeneous and/or isotonic. Pharmaceutical compositions may be prepared in certain embodiments in an aqueous form, for example in a pre-filled syringe or other single- or multi-dose container. In certain embodiments, the pharmaceutical compositions of the invention are ophthalmically compatible and suitable for ophthalmic administration to a human subject by, for example, topical or other known methods of delivery. In some embodiments, the disclosed pharmaceutical compositions are suitable for intravitreal administration. In some embodiments, the pharmaceutical compositions of the invention are suitable for administration by intravitreal infusion. In yet another embodiment, the pharmaceutical compositions are administered orally.

As used herein, the phrase "pharmaceutically acceptable" means that the compounds, materials, compositions, and/or dosage forms are within the scope of sound medical judgment and are suitable for use in contact with tissues of humans and other animals. In some embodiments, "pharmaceutically acceptable" means approved by a regulatory agency of the Federal government or a state government or listed in the U.S. Pharmacopeia or other generally recognized pharmacopeia for use in animals, and more particularly in humans. In some embodiments, the pharmaceutically acceptable compounds, materials, compositions, and/or dosage forms result in no persistent detrimental effect on the subject, or on the general health of the subject being treated. However, it will be recognized that transient effects, such as minor irritation or a "stinging" sensation, are common with administration of medicament and the existence of such transient effects is not inconsistent with the composition, formulation, or ingredient (e.g., excipient) in question.

As used herein, the phrase "pharmaceutically acceptable salt(s)," includes, but is not limited to, salts of acidic or basic groups. Compounds that are basic in nature are capable of forming a wide variety of salts with various inorganic and organic acids. Acids that may be used to prepare pharmaceutically acceptable acid addition salts of such basic compounds are those that form non-toxic acid addition salts, i.e., salts containing pharmacologically acceptable anions including, but not limited to, sulfuric, thiosulfuric, citric, maleic, acetic, oxalic, hydrochloride, hydrobromide, hydroiodide, nitrate, sulfate, bisulfate, bisulfite, phosphate, acid phosphate, isonicotinate, borate, acetate, lactate, salicylate, citrate, acid citrate, tartrate, oleate, tannate, pantothenate, bitartrate, ascorbate, succinate, maleate, gentisinate, fumarate, gluconate, glucaronate, saccharate, formate, benzoate, glutamate, methanesulfonate, ethanesulfonate, benzenesulfonate, p-toluenesulfonate, bicarbonate, malonate, mesylate, esylate, napsydisylate, tosylate, besylate, orthophoshate, trifluoroacetate, and pamoate (i.e., 1,1'-methylene-bis-(2-hydroxy-3-naphthoate)) salts. Compounds that include an amino moiety may form pharmaceutically acceptable salts with various amino acids, in addition to the acids mentioned above. Compounds that are acidic in nature are capable of forming base salts with various pharmacologically acceptable cations. Examples of such salts include, but are not limited to, alkali metal or alkaline earth metal salts and, particularly, calcium, magnesium, ammonium, sodium, lithium, zinc, potassium, and iron salts. Salts also includes quaternary ammonium salts of the compounds described herein, where the compounds have one or more tertiary amine moiety.

As used herein, the terms "prevention" or "preventing" mean a reduction of the risk of acquiring myopia.

As used herein, the term "prodrug" means a derivative of a known direct acting drug, which derivative may have enhanced delivery characteristics and therapeutic value as compared to the active drug, and is transformed into the active drug by an enzymatic or chemical process.

As used herein, the term "purified" means that when isolated, the isolate contains at least 90%, at least 95%, at least 98%, at least 99%, or 100% of a compound described herein by weight of the isolate.

As used herein, the phrase "quaternary ammonium salts" means derivatives of the disclosed compounds with one or more tertiary amine moieties wherein at least one of the tertiary amine moieties in the parent compound is modified by converting the tertiary amine moiety to a quaternary ammonium cation via alkylation (and the cations are balanced by anions such as $Cl^-$, $CH_3COO^-$, and $CF_3COO^-$), for example methylation or ethylation.

As used herein, the phrase "solubilizing agent" means agents that result in formation of a micellar solution or a true solution of the drug.

As used herein, the term "solution/suspension" means a liquid composition wherein a first portion of the active agent is present in solution and a second portion of the active agent is present in particulate form, in suspension in a liquid matrix.

As used herein, the phrase "substantially isolated" means a compound that is at least partially or substantially separated from the environment in which it is formed or detected.

As used herein, the phrase "therapeutically effective amount" means the amount of active compound or pharmaceutical agent that elicits the biological or medicinal response that is being sought in a tissue, system, animal, individual or human by a researcher, veterinarian, medical doctor, or other clinician. The therapeutic effect is dependent upon the disorder being treated or the biological effect desired. As such, the therapeutic effect can be a decrease in the severity of symptoms associated with the disorder and/or inhibition (partial or complete) of progression of the disorder, or improved treatment, healing, prevention or elimination of a disorder, or side-effects. The amount needed to elicit the therapeutic response can be based on, for example, the age, health, size, and sex of the subject. Optimal amounts can also be determined based on monitoring of the subject's response to treatment.

As used herein, the terms "treat," "treated," or "treating" mean both therapeutic treatment and prophylactic or preventative measures wherein the object is to prevent or slow down (lessen) myopia, or obtain beneficial or desired clinical results. For purposes herein, beneficial or desired clinical results include, but are not limited to, alleviation of symptoms; diminishment of extent of myopia; stabilized (i.e., not worsening) state of myopia; delay in onset or slowing of myopia or myopia progression; amelioration of myopia, whether detectable or undetectable; an amelioration of at least one measurable physical parameter, not necessarily discernible by the patient; or enhancement or improvement of myopia. Treatment includes eliciting a clinically significant response, optionally without excessive levels of side effects.

It should be appreciated that particular features of the disclosure, which are, for clarity, described in the context of separate embodiments, can also be provided in combination in a single embodiment. Conversely, various features of the disclosure which are, for brevity, described in the context of a single embodiment, can also be provided separately or in any suitable subcombination.

Resolution of racemic mixtures of compounds can be carried out by any of numerous methods known in the art, including, for example, fractional recrystallization using a chiral resolving acid which is an optically active, salt-forming organic acid. Suitable resolving agents for fractional recrystallization methods include, but are not limited to, optically active acids, such as the D and L forms of tartaric acid, diacetyltartaric acid, dibenzoyltartaric acid, mandelic acid, malic acid, lactic acid, and the various optically active camphorsulfonic acids such as β-camphorsulfonic acid. Other resolving agents suitable for fractional crystallization methods include, but are not limited to, stereoisomerically pure forms of α-methylbenzylamine (e.g., S and R forms, or diastereomerically pure forms), 2-phenylglycinol, norephedrine, ephedrine, N-methylephedrine, cyclohexylethylamine, 1,2-diaminocyclohexane, and the like. Resolution of racemic mixtures can also be carried out by elution on a column packed with an optically active resolving agent (e.g., dinitrobenzoylphenylglycine). Suitable elution solvent compositions can be determined by one skilled in the art.

Appropriate compounds described herein may also include tautomeric forms. Tautomeric forms result from the swapping of a single bond with an adjacent double bond together with the concomitant migration of a proton. Tautomeric forms include prototropic tautomers which are isomeric protonation states having the same empirical formula and total charge. Examples of prototropic tautomers include, but are not limited to, ketone-enol pairs, amide-imidic acid pairs, lactam-lactim pairs, amide-imidic acid pairs, enamine-imine pairs, and annular forms where a proton can occupy two or more positions of a heterocyclic system including, but not limited to, 1H- and 3H-imidazole, 1H-, 2H- and 4H-1,2,4-triazole, 1H- and 2H-isoindole, and 1H- and 2H-pyrazole. Tautomeric forms can be in equilibrium or sterically locked into one form by appropriate substitution.

The compounds described herein also include hydrates and solvates, as well as anhydrous and non-solvated forms.

The compounds described herein can also include all isotopes of atoms occurring in the intermediates or final compounds. Isotopes include those atoms having the same atomic number but different mass numbers. For example, isotopes of hydrogen include tritium and deuterium. Carbon ($^{12}C$) can be replaced at any position with $^{13}C$ or $^{14}C$. Nitrogen ($^{14}N$) can be replaced with $^{15}N$. Oxygen ($^{16}O$) can be replaced at any position with $^{17}O$ or $^{18}O$. Sulfur ($^{32}S$) can be replaced with $^{33}S$, $^{34}S$ or $^{36}S$. Chlorine ($^{35}Cl$) can be replaced with $^{37}Cl$. Bromine ($^{79}Br$) can be replaced with $^{81}Br$.

In some embodiments, the compounds, or salts thereof, are substantially isolated. Partial separation can include, for example, a composition enriched in any one or more of the compounds described herein. Substantial separation can include compositions containing at least about 50%, at least about 60%, at least about 70%, at least about 80%, at least about 90%, at least about 95%, at least about 97%, or at least about 99% by weight of any one or more of the compounds described herein, or salt thereof. Methods for isolating compounds and their salts are routine in the art.

The compounds described herein may be prepared as prodrugs. Examples of prodrugs include compounds as described herein that contain one or more molecular moieties appended to a hydroxyl, amino, sulfhydryl, or carboxyl group of the compound, and that when administered to a patient, cleaves in vivo to form the free hydroxyl, amino, sulfhydryl, or carboxyl group, respectively. Examples of prodrugs include, but are not limited to, acetate, formate and benzoate derivatives of alcohol and amine functional groups in the compounds described herein. Preparation and use of prodrugs is discussed in T. Higuchi et al., "Pro-drugs as Novel Delivery Systems," Vol. 14 of the A.C.S. Symposium Series, and in Bioreversible Carriers in Drug Design, ed. Edward B. Roche, American Pharmaceutical Association and Pergamon Press, 1987, both of which are incorporated herein by reference in their entireties.

Compounds containing an amine function can also form N-oxides. A reference herein to a compound that contains an amine function also includes the N-oxide. Where a compound contains several amine functions, one or more than one nitrogen atom can be oxidized to form an N-oxide. Examples of N-oxides include N-oxides of a tertiary amine or a nitrogen atom of a nitrogen-containing heterocycle. N-Oxides can be formed by treatment of the corresponding amine with an oxidizing agent such as hydrogen peroxide or a per-acid (e.g., a peroxycarboxylic acid) (see, Advanced Organic Chemistry, by Jerry March, 4th Edition, Wiley Interscience).

Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

The present disclosure provides aqueous pharmaceutical solutions comprising benzyl atropine of Formula I:

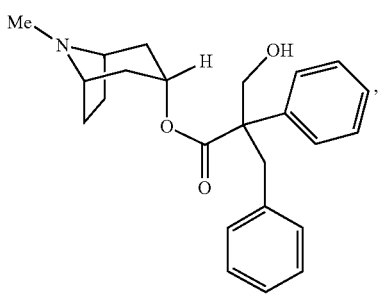

(I)

or a pharmaceutically acceptable salt or prodrug thereof, at least one buffer, at least one tonicity agent, and at least one solubilizing agent. In some embodiments, the concentration of the benzyl atropine or a pharmaceutically acceptable salt or prodrug thereof is from about 0.01 to about 0.2% (wt/wt). In some embodiments, the concentration of the benzyl atropine or a pharmaceutically acceptable salt or prodrug thereof is from about 0.05 to about 0.2% (wt/wt). In some embodiments, the concentration of the benzyl atropine or a pharmaceutically acceptable salt or prodrug thereof is from about 0.1 to about 0.15% (wt/wt). In some embodiments, the concentration of the benzyl atropine or a pharmaceutically acceptable salt or prodrug thereof is from about 0.11 to about 0.14% (wt/wt). In some embodiments, the concentration of the benzyl atropine or a pharmaceutically acceptable salt or prodrug thereof is from about 0.12 to about 0.13% (wt/wt).

In some embodiments, the at least one buffer comprises at least one acetate buffer, at least one propionate buffer, at least one malate buffer, at least one fumarate buffer, at least one lactate buffer, at least one malonate buffer, at least one malate buffer, at least one mandelate buffer, at least one citrate buffer, at least one tartrate buffer, at least one succinate buffer, at least one phosphate buffer, at least one boric buffer, at least one bicarbonate buffer, or at least one buffer comprising 2-amino-2-methyl-1-propanol. In some embodiments, the at least one buffer comprises at least one phosphate buffer. In some embodiments, the at least one buffer comprises at least one acetate buffer. In some embodiments, the at least one buffer comprises at least one propionate buffer. In some embodiments, the at least one buffer comprises at least one malate buffer. In some embodiments, the at least one buffer comprises at least one fumarate buffer. In some embodiments, the at least one buffer comprises at least one lactate buffer. In some embodiments, the at least one buffer comprises at least one malonate buffer. In some embodiments, the at least one buffer comprises at least one malate buffer. In some embodiments, the at least one buffer comprises at least one mandelate buffer. In some embodiments, the at least one buffer comprises at least one citrate buffer. In some embodiments, the at least one buffer comprises at least one tartrate buffer. In some embodiments, the at least one buffer comprises at least one succinate buffer. In some embodiments, the at least one buffer comprises at least one phosphate buffer. In some embodiments, the at least one buffer comprises at least one boric buffer. In some embodiments, the at least one buffer comprises at least one bicarbonate buffer. In some embodiments, the at least one buffer comprises at least one buffer comprising 2-amino-2-methyl-1-propanol.

In some embodiments, the aqueous pharmaceutical solution further comprises at least one additional buffer. In some embodiments, the at least one additional buffer comprises at least one acetate buffer. In some embodiments, the at least one buffer comprises at least one phosphate buffer and the at least one additional buffer comprises at least one acetate buffer.

In some embodiments, a concentration of the at least one buffer is from about 0.1 to about 50 mM. In some embodiments, the concentration of the at least one buffer is from about 5 to about 40 mM. In some embodiments, the concentration of the at least one buffer is from about 10 to about 30 mM. In some embodiments, the concentration of the at least one buffer is from about 15 to about 20 mM. In some embodiments, the concentration of the at least one buffer is about 18 mM. In some embodiments, the concentration of the at least one buffer is about 18 mM. In some embodiments, the concentration of the at least one buffer is from about 20 to about 40 mM. In some embodiments, the concentration of the at least one buffer is from about 25 to about 35 mM. In some embodiments, the concentration of the at least one buffer is about 30 mM. In some embodiments, the concentration of the at least one buffer is about 30 mM.

In some embodiments, the at least one buffer comprises at least one acetate buffer or at least one phosphate buffer. In some embodiments, the concentration of the at least one buffer is from about 15 to about 25 mM. In some embodiments, the concentration of the at least one buffer is about 20 mM. In some embodiments, the concentration of the at least one buffer is about 20 mM.

In some embodiments, the at least one buffer comprises at least one citrate buffer or at least one phosphate buffer.

In some embodiments, the concentration of the at least one additional buffer is from about 0.1 to about 50 mM. In some embodiments, the concentration of the at least one additional buffer is from about 0.5 to about 15 mM. In some embodiments, the concentration of the at least one additional buffer is from about 1 to about 10 mM. In some embodiments, the concentration of the at least one additional buffer is from about 2.5 to about 7.5 mM. In some embodiments, the concentration of the at least one additional buffer is about 5 mM. In some embodiments, wherein the concentration of the at least one additional buffer is about 5 mM. In some embodiments, the at least one additional buffer comprises at least one phosphate buffer.

In some embodiments, the at least one tonicity agent comprises sorbitol, propylene glycol, dextrose, glycerin, mannitol, potassium chloride, or sodium chloride, or any combination thereof. In some embodiments, the at least one tonicity agent comprises sorbitol. In some embodiments, the at least one tonicity agent comprises propylene glycol. In some embodiments, the at least one tonicity agent comprises dextrose. In some embodiments, the at least one tonicity agent comprises glycerin. In some embodiments, the at least one tonicity agent comprises mannitol. In some embodiments, the at least one tonicity agent comprises potassium chloride. In some embodiments, the at least one tonicity agent comprises sodium chloride. In some embodiments, the concentration of the at least one tonicity agent is from about 0.01 to about 5% (wt/wt) based on the total weight of the aqueous pharmaceutical solution. In some embodiments, the concentration of the at least one tonicity agent is from about 0.05 to about 2.5% (wt/wt) based on the total weight of the aqueous pharmaceutical solution. In some embodiments, the concentration of the at least one tonicity agent is from about 0.1 to about 1% (wt/wt) based on the total weight of the aqueous pharmaceutical solution. In some embodiments, the concentration of the at least one tonicity agent is about 0.3% (wt/wt) based on the total weight of the aqueous pharmaceutical solution. In some embodiments, the concentration of the at least one tonicity agent is about 0.3% (wt/wt) based on the total weight of the aqueous pharmaceutical solution. In some embodiments, the at least one tonicity agent is sodium chloride. In some embodiments, the concentration of the at least one tonicity agent is from about 0.1 to about 3% (wt/wt) based on the total weight of the aqueous pharmaceutical solution. In some embodiments, the concentration of the at least one tonicity agent is from about 0.5 to about 1.5% (wt/wt) based on the total weight of the aqueous pharmaceutical solution. In some embodiments, the concentration of the at least one tonicity agent is about 1% (wt/wt) based on the total weight of the aqueous pharmaceutical solution. In some embodiments, the concentration of the at least one tonicity agent is about 1% (wt/wt) based on the total weight of the aqueous pharmaceutical solution. In some embodiments, the at least one tonicity agent comprises propylene glycol. In some embodiments, the concentration of the at least one tonicity agent is from about 1.5 to about 2.5% (wt/wt) based on the total weight of the aqueous pharmaceutical solution. In some embodiments, the concentration of the at least one tonicity agent is about 2% (wt/wt) based on the total weight of the aqueous pharmaceutical solution. In some embodiments, the concentration of the at least one tonicity agent is about 2% (wt/wt) based on the total weight of the aqueous pharmaceutical solution. In some embodiments, the at least one tonicity agent comprises glycerol.

In some embodiments, the osmolarity of the aqueous pharmaceutical solution is from about 260 to about 330 mOsm/kg based on the total weight of the aqueous pharmaceutical solution. In some embodiments, the osmolarity of the aqueous pharmaceutical solution is from about 270 to about 320 mOsm/kg based on the total weight of the aqueous pharmaceutical solution. In some embodiments, the osmolarity of the aqueous pharmaceutical solution is from about 280 to about 310 mOsm/kg based on the total weight of the aqueous pharmaceutical solution. In some embodiments, the osmolarity of the aqueous pharmaceutical solution is from about 290 to about 300 mOsm/kg based on the total weight of the aqueous pharmaceutical solution. In some embodiments, wherein the osmolarity of the aqueous pharmaceutical solution is about 300 mOsm/kg based on the total weight of the aqueous pharmaceutical solution.

In some embodiments, the at least one solubilizing agent comprises polyethylene glycol-400, polyethylene glycol-35/castor oil, polypropylene glycol, polysorbate-80, polyethylene glycol-40 stearate, poloxamer-407, dimethyl sulfoxide, or hydroxypropyl-β-cyclodextrin, or any combination thereof. In some embodiments, the at least one solubilizing agent comprises polyethylene glycol-400. In some embodiments, the at least one solubilizing agent comprises polyethylene glycol-35/castor oil. In some embodiments, the at least one solubilizing agent comprises polypropylene glycol. In some embodiments, the at least one solubilizing agent comprises polysorbate-80. In some embodiments, the at least one solubilizing agent comprises polyethylene glycol-40 stearate. In some embodiments, the at least one solubilizing agent comprises poloxamer-407. In some embodiments, the at least one solubilizing agent comprises dimethyl sulfoxide.
In some embodiments, the at least one solubilizing agent comprises hydroxypropyl-β-cyclodextrin.

In some embodiments, the concentration of the at least one solubilizing agent is from about 0.1 to about 30% (wt/wt) based on the total weight of the aqueous pharmaceutical solution. In some embodiments, the concentration of the at least one solubilizing agent is from about 1 to about 10% (wt/wt) based on the total weight of the aqueous pharmaceutical solution.

In some embodiments, the at least one solubilizing agent comprises polyethylene glycol-400 and wherein the concentration of the polyethylene glycol-400 is about 1, about 3.5, or about 5% (wt/wt) based on the total weight of the aqueous pharmaceutical solution. In some embodiments, the at least one solubilizing agent comprises polyethylene glycol-35/castor oil and wherein the concentration of the polyethylene glycol-35/castor oil is about 5% (wt/wt) based on the total weight of the aqueous pharmaceutical solution.

In some embodiments, the at least one solubilizing agent comprises polysorbate-80 and wherein the concentration of the polysorbate-80 is about 1 or about 4% (wt/wt) based on the total weight of the aqueous pharmaceutical solution. In some embodiments, the at least one solubilizing agent comprises polyethylene glycol-40 stearate and wherein the concentration of the polyethylene glycol-40 stearate is about 7% (wt/wt) based on the total weight of the aqueous pharmaceutical solution.

In some embodiments, the at least one solubilizing agent comprises poloxamer-407 and wherein the concentration of the poloxamer-407 is about 2% (wt/wt) based on the total weight of the aqueous pharmaceutical solution.

In some embodiments, the at least one solubilizing agent comprises dimethyl sulfoxide and wherein the concentration of the dimethyl sulfoxide is about 20% (wt/wt) based on the total weight of the aqueous pharmaceutical solution.

In some embodiments, the at least one solubilizing agent comprises hydroxypropyl-β-cyclodextrin and wherein the concentration of the hydroxypropyl-β-cyclodextrin is about 2.5, about 5, or about 10% (wt/wt) based on the total weight of the aqueous pharmaceutical solution.

In some embodiments, the aqueous pharmaceutical solution comprises at least one additional solubilizing agent. In some embodiments, the at least one additional solubilizing agent comprises polyethylene glycol-400, polyethylene glycol-35/castor oil, polypropylene glycol, polysorbate-80, polyethylene glycol-40 stearate, poloxamer-407, dimethyl sulfoxide, or hydroxypropyl-β-cyclodextrin, or any combination thereof.

In some embodiments, the at least one additional solubilizing agent comprises polyethylene glycol-400. In some embodiments, the at least one additional solubilizing agent comprises polyethylene glycol-35/castor oil. In some embodiments, the at least one additional solubilizing agent comprises polypropylene glycol. In some embodiments, the at least one additional solubilizing agent comprises polysorbate-80. In some embodiments, the at least one additional solubilizing agent comprises polyethylene glycol-40 stearate. In some embodiments, the at least one additional solubilizing agent comprises poloxamer-407. In some embodiments, the at least one additional solubilizing agent comprises dimethyl sulfoxide. In some embodiments, the at least one additional solubilizing agent comprises hydroxypropyl-β-cyclodextrin. In some embodiments, the concentration of the at least one additional solubilizing agent is from about 0.1 to about 30% (wt/wt) based on the total weight of the aqueous pharmaceutical solution. In some embodiments, the concentration of the at least one additional solubilizing agent is from about 1 to about 10% (wt/wt) based on the total weight of the aqueous pharmaceutical solution.

In some embodiments, the at least one additional solubilizing agent comprises polyethylene glycol-400 and wherein the concentration of the polyethylene glycol-400 is about 1, about 3.5, or about 5% (wt/wt) based on the total weight of the aqueous pharmaceutical solution.

In some embodiments, the at least one additional solubilizing agent comprises polyethylene glycol-35/castor oil and wherein the concentration of the polyethylene glycol-35/castor oil is about 5% (wt/wt) based on the total weight of the aqueous pharmaceutical solution.

In some embodiments, the at least one additional solubilizing agent comprises polysorbate-80 and wherein the concentration of the polysorbate-80 is about 1 or about 4% (wt/wt) based on the total weight of the aqueous pharmaceutical solution.

In some embodiments, the at least one additional solubilizing agent comprises polyethylene glycol-40 stearate and wherein the concentration of the polyethylene glycol-40 stearate is about 7% (wt/wt) based on the total weight of the aqueous pharmaceutical solution.

In some embodiments, the at least one additional solubilizing agent comprises poloxamer-407 and wherein the concentration of the poloxamer-407 is about 2% (wt/wt) based on the total weight of the aqueous pharmaceutical solution.

In some embodiments, the at least one additional solubilizing agent comprises dimethyl sulfoxide and wherein the concentration of the dimethyl sulfoxide is about 20% (wt/wt) based on the total weight of the aqueous pharmaceutical solution.

In some embodiments, the at least one additional solubilizing agent comprises hydroxypropyl-β-cyclodextrin and wherein the concentration of the hydroxypropyl-β-cyclodextrin is about 2.5, about 5, or about 10% (wt/wt) based on the total weight of the aqueous pharmaceutical solution.

In some embodiments, the combined concentration of the at least one solubilizing agent and the at least one additional solubilizing agent is greater than 5.0% (wt/wt) based on the total weight of the aqueous pharmaceutical solution.

In some embodiments, the aqueous pharmaceutical solution has a pH value from about 5 to about 8. In some embodiments, the aqueous pharmaceutical solution has a pH value from about 5 to about 7. In some embodiments, the aqueous pharmaceutical solution has a pH value from about 5.0 to about 7.0. In some embodiments, the aqueous pharmaceutical solution has a pH value from about 5 to about 6. In some embodiments, the aqueous pharmaceutical solution has a pH value from about 5.0 to about 6.0. In some embodiments, the aqueous pharmaceutical solution has a pH value from about 5.5 to about 6.5. In some embodiments, the aqueous pharmaceutical solution has a pH value of about 5.5. In some embodiments, the aqueous pharmaceutical solution has a pH value of about 6. In some embodiments, the aqueous pharmaceutical solution has a pH value of about 5.5. In some embodiments, the aqueous pharmaceutical solution has a pH value of about 6.

In some embodiments, the aqueous pharmaceutical solution further comprises at least one preservative. In some embodiments, the at least one preservative comprises benzalkonium chloride, methyl paraben, ethyl paraben, propyl paraben, butyl paraben, benzyl alcohol, chlorobutanol, phenol, meta cresol, chloro cresol, benzoic acid, sorbic acid, thiomersal, phenylmercuric nitrate, bronopol, propylene glycol, polyquaternium-1, or benzethonium chloride, or any combination thereof.

In some embodiments, the at least one preservative comprises benzalkonium chloride. In some embodiments, the at least one preservative comprises methyl paraben. In some embodiments, the at least one preservative comprises ethyl paraben. In some embodiments, the at least one preservative comprises propyl paraben. In some embodiments, the at least one preservative comprises butyl paraben. In some embodiments, the at least one preservative comprises benzyl alcohol. In some embodiments, the at least one preservative comprises chlorobutanol. In some embodiments, the at least one preservative comprises phenol. In some embodiments, the at least one preservative comprises meta cresol. In some embodiments, the at least one preservative comprises chloro cresol. In some embodiments, the at least one preservative comprises benzoic acid. In some embodiments, the at least one preservative comprises sorbic acid. In some embodiments, the at least one preservative comprises thiomersal. In some embodiments, the at least one preservative comprises phenylmercuric nitrate. In some embodiments, the at least one preservative comprises bronopol. In some embodiments, the at least one preservative comprises propylene glycol. In some embodiments, the at least one preservative comprises polyquaternium-1. In some embodiments, the at least one preservative comprises benzethonium chloride.

In some embodiments, the aqueous pharmaceutical solution does not comprise a preservative. In some embodiments, wherein the aqueous pharmaceutical solution does not comprise benzalkonium chloride, methyl paraben, ethyl paraben, propyl paraben, butyl paraben, benzyl alcohol, chlorobutanol, phenol, meta cresol, chloro cresol, benzoic acid, sorbic acid, thiomersal, phenylmercuric nitrate, bronopol, propylene glycol, polyquaternium-1, or benzethonium chloride.

In some embodiments, wherein the aqueous pharmaceutical solution does not comprise benzalkonium chloride. In some embodiments, wherein the aqueous pharmaceutical solution does not comprise methyl paraben. In some embodiments, wherein the aqueous pharmaceutical solution does not comprise ethyl paraben. In some embodiments, wherein the aqueous pharmaceutical solution does not comprise propyl paraben. In some embodiments, wherein the aqueous pharmaceutical solution does not comprise butyl paraben. In some embodiments, wherein the aqueous pharmaceutical solution does not comprise benzyl alcohol. In some embodiments, wherein the aqueous pharmaceutical solution does not comprise chlorobutanol. In some embodiments, wherein the aqueous pharmaceutical solution does not comprise phenol. In some embodiments, wherein the aqueous pharmaceutical solution does not comprise meta cresol. In some embodiments, wherein the aqueous pharmaceutical solution does not comprise chloro cresol. In some embodiments, wherein the aqueous pharmaceutical solution does not comprise benzoic acid. In some embodiments, wherein the aqueous pharmaceutical solution does not comprise sorbic acid. In some embodiments, wherein the aqueous pharmaceutical solution does not comprise thiomersal. In some embodiments, wherein the aqueous pharmaceutical solution does not comprise phenylmercuric nitrate. In some embodiments, wherein the aqueous pharmaceutical solution does not comprise bronopol. In some embodiments, wherein the aqueous pharmaceutical solution does not comprise propylene glycol. In some embodiments, wherein the aqueous pharmaceutical solution does not comprise polyquaternium-1. In some embodiments, wherein the aqueous pharmaceutical solution does not comprise benzethonium chloride.

In some embodiments, the aqueous pharmaceutical solution is disposed in a dropper bottle. In some embodiments, the dropper bottle is a multi-use dropper bottle.

In some embodiments, the aqueous pharmaceutical solution further comprises at least one additional buffer and at least one additional solubilizing agent. In some embodiments, the concentration of the benzyl atropine is from about 0.05 to about 0.2% (wt/wt). In some embodiments, the at least one buffer comprises at least one acetate buffer. In some embodiments, the at least one tonicity agent comprises sodium chloride. In some embodiments, the at least one solubilizing agent comprises polyethylene glycol-400. In some embodiments, the at least one additional buffer comprises at least one phosphate buffer. In some embodiments, the at least one additional solubilizing agent comprises polyethylene glycol-35. In some embodiments, the aqueous pharmaceutical solution has a pH value from about 5 to about 6.

In some embodiments, the aqueous pharmaceutical solution further comprises at least one additional buffer and at least one additional solubilizing agent. In some embodiments, the concentration of the benzyl atropine is from about 0.1 to about 0.15% (wt/wt). In some embodiments, the at least one buffer comprises at least one acetate buffer. In some embodiments, the at least one tonicity agent comprises sodium chloride. In some embodiments, the at least one solubilizing agent comprises polyethylene glycol-400. In some embodiments, the at least one additional buffer comprises at least one phosphate buffer. In some embodiments, the at least one additional solubilizing agent comprises polyethylene glycol-35. In some embodiments, the aqueous pharmaceutical solution has a pH value from about 6 to about 7.

In some embodiments, the concentration of the benzyl atropine or a pharmaceutically acceptable salt or prodrug thereof is from about 0.1 to about 0.15% (wt/wt). In some embodiments, the at least one buffer comprises at least one acetate buffer. In some embodiments, the at least one tonicity agent comprises mannitol or sodium chloride. In some embodiments, the at least one solubilizing agent comprises hydroxypropyl-β-cyclodextrin. In some embodiments, the aqueous pharmaceutical solution has a pH value from about 5.5 to about 6.5.

The present disclosure also provides processes of preparing an aqueous solution comprising benzyl atropine of Formula I:

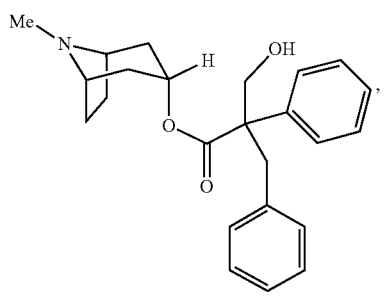

(I)

or a pharmaceutically acceptable salt or prodrug thereof, comprising: providing an aqueous solution comprising at least one acetate buffer, at least one solubilizing agent, and at least one additional solubilizing agent; and adding to the aqueous solution the benzyl atropine or a pharmaceutically acceptable salt or prodrug thereof. In some embodiments, the aqueous solution has a pH value from about 4 to about 5. In some embodiments, the benzyl atropine or a pharmaceutically acceptable salt or prodrug thereof dissolves in the aqueous solution, thereby providing an aqueous solution. In some embodiments, the concentration of the benzyl atropine or a pharmaceutically acceptable salt or prodrug thereof in the aqueous solution of benzyl atropine is from about 0.05 to about 0.2% (wt/wt). In some embodiments, the aqueous solution of benzyl atropine or a pharmaceutically acceptable salt or prodrug thereof has a pH value of greater than about 5.

The present disclosure also provides products of a process of preparing an aqueous solution comprising benzyl atropine of Formula I:

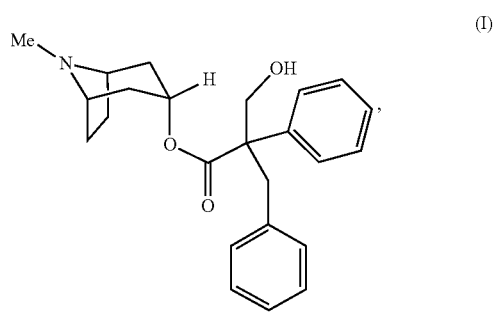 [SMILES: CN1C2CCC1CC(OC(=O)C(CO)(Cc1ccccc1)c1ccccc1)C2]

(I)

or a pharmaceutically acceptable salt or prodrug thereof comprising: providing an aqueous solution comprising at least one acetate buffer, at least one solubilizing agent, and at least one additional solubilizing agent; and adding to the aqueous solution the benzyl atropine or a pharmaceutically acceptable salt or prodrug thereof. In some embodiments, the aqueous solution has a pH value from about 4 to about 5. In some embodiments, the benzyl atropine or a pharmaceutically acceptable salt or prodrug thereof dissolves in the aqueous solution, thereby providing an aqueous solution. In some embodiments, the concentration of the benzyl atropine or a pharmaceutically acceptable salt or prodrug thereof in the aqueous solution is from about 0.05 to about 0.2% (wt/wt). In some embodiments, the aqueous solution of benzyl atropine or a pharmaceutically acceptable salt or prodrug thereof has a pH value of greater than about 5.

The present disclosure also provides methods of preventing myopia, treating myopia, reducing myopia progression, or preventing myopia progression in a subject in need thereof, comprising administering to the eye of the subject a therapeutically effective amount of an aqueous pharmaceutical solution comprising benzyl atropine of Formula I:

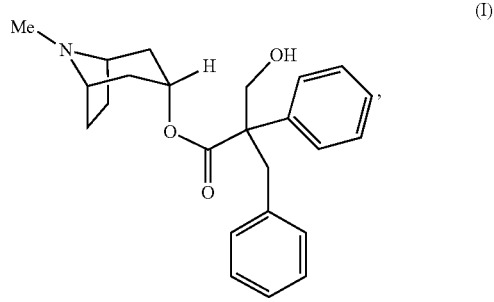 [SMILES: CN1C2CCC1CC(OC(=O)C(CO)(Cc1ccccc1)c1ccccc1)C2]

(I)

or a pharmaceutically acceptable salt or prodrug thereof, at least one buffer, at least one tonicity agent, and at least one solubilizing agent. In some embodiments, the concentration of the benzyl atropine or a pharmaceutically acceptable salt or prodrug thereof is from about 0.05 to about 0.2% (wt/wt). In some embodiments, the method of preventing myopia, treating myopia, reducing myopia progression, or preventing myopia comprises a method of preventing myopia. In some embodiments, the method of preventing myopia, treating myopia, reducing myopia progression, or preventing myopia comprises treating myopia. In some embodiments, the method of preventing myopia, treating myopia, reducing myopia progression, or preventing myopia comprises reducing myopia. In some embodiments, the method of preventing myopia, treating myopia, reducing myopia progression, or preventing myopia comprises preventing myopia. In some embodiments, the aqueous pharmaceutical solution is administered once a day. In some embodiments, the aqueous pharmaceutical solution is administered twice a day. In some embodiments, the aqueous pharmaceutical solution is administered every other day and wherein the concentration of the benzyl atropine in the aqueous pharmaceutical solution is higher than that which would be necessary to treat myopia in the subject if the aqueous pharmaceutical solution was administered to the eye of the subject once a day.

The compounds described herein can be contained in formulations with pharmaceutically acceptable diluents, fillers, disintegrants, binders, lubricants, surfactants, hydrophobic vehicles, water soluble vehicles, emulsifiers, buffers, humectants, moisturizers, solubilizers, preservatives and the like. The pharmaceutical compositions can also comprise suitable solid or gel phase carriers or excipients. Examples of such carriers or excipients include, but are not limited to, calcium carbonate, calcium phosphate, various sugars, starches, cellulose derivatives, gelatin, and polymers such as polyethylene glycols. In some embodiments, the compounds described herein can be used with agents including, but not limited to, topical analgesics (e.g., lidocaine), barrier devices (e.g., GelClair), or rinses (e.g., Caphosol). Pharmaceutical carriers can be liquids, such as water and oils, including those of petroleum, animal, vegetable or synthetic origin, such as peanut oil, soybean oil, mineral oil, sesame oil, and the like. The pharmaceutical carriers can also be saline, gum acacia, gelatin, starch paste, talc, keratin, colloidal silica, urea, and the like. In addition, auxiliary, stabilizing, thickening, lubricating and coloring agents can be used.

The compounds described herein can be administered either alone (as a single compound or one or more compounds described herein) or in combination (concurrently or serially) with other pharmaceutical agents. For example, the compounds can be administered in combination with any one or more of the following: antibiotics (for example: a) protein synthesis inhibitors including, but not limited to, amikacin, anisomycin, apramycin, azithromycin, blasticidine S, brefeldin A, butirosin, chloramphenicol, chlortetracycline, clindamycin, clotrimazole, cycloheximide, demeclocycline, dibekacin, dihydrostreptomycin, doxycycline, duramycin, emetine, erythromycin, fusidic acid, G 418, gentamicin, helvolic acid, hygromycin B, josamycin, kanamycin, kirromycin, lincomycin, meclocycline, mepartricin, midecamycin, minocycline, neomycin, netilmicin, nitrofurantoin, nourseothricin, oleandomycin, oxytetracycline, paromomycin, puromycin, rapamycin, ribostamycin, rifampicin, rifamycin, rosamicin, sisomicin, spectinomycin, spiramycin, streptomycin, tetracycline, domeclocycline, thiamphenicol, methacycline, thiostrepton, tobramycin, tunicamycin, tylosin, viomycin, and virginiamycin; b) DNA synthesis interfering agents including, but not limited to, camptothecin, 10-deacetylbaccatin III, azacytidine, 7-Page aminoactinomycin D, 8-quinolinol, 9-dihydro-13-acetylbaccatin III, aclarubicin, actinomycin D, actinomycin I, actinomycin V, bafilomycin A1, bleomycin, capreomycin, chromomycin, cinoxacin, ciprofloxacin, norfloxacin, cis-diammineplatinum(II) dichloride, coumermycin A1, L(+)-lactic acid, cytochalasin B, cytochalasin D, dacarbazine, daunorubicin, distamycin A, doxorubicin, echinomycin, enrofloxacin, etoposide, flumequine, formycin, fumagillin, ganciclovir, gliotoxin, lomefloxacin, metronidazole, mithramycin A, mitomycin C, nalidixic acid, netropsin, nitrofurantoin, nogalamycin, nonactin, novobiocin, ofloxacin, oxolinic acid, paclitaxel, phenazine, phleomycin, pipemidic acid, rebeccamycin, sinefungin, streptonigrin, streptozocin, succinylsulfathiazole, sulfadiazine, sulfadimethoxine, sulfaguanidine purum, sulfamethazine, sulfamonomethoxine, sulfanilamide, sulfaquinoxaline, sulfasalazine, sulfacetamide, sulfathiazole, trimethoprim, tubercidin, 5-azacytidine, cordycepin, and formycin A; c) cell wall synthesis interfering agents including, but not limited to, (+)-6-aminopenicillanic acid, 7-Aminodesacetoxycephalosporanic acid, amoxicillin, ampicillin, azlocillin, bacitracin, carbenicillin, cefaclor, cefamandole, cefazolin, cefnnetazole, cefixime, cefoperazone, cefotaxime, cefsulodin, ceftriaxone, cephalexin, cephalosporin C, cephalothin, cephradine, ceftazidime, cloxacillin, D-cycloserine, dicloxacillin, D-penicillamine, ceftizoxime, econazole, ethambutol, lysostaphin, moxalactam, nafcillin, nikkomycin Z, nitrofurantoin, oxacillin, penicillic, penicillin G, phenethicillin, phenoxymethylpenicillinic acid, phosphomycin, pipemidic acid, piperacillin, ristomycin, and vancomycin; d) cell membrane permeability interfering agents (ionophores) including, but not limited to, amphotericin B, 2-mercaptopyridine, 4-bromocalcimycin A23187, colistin, alamethicin, calcimycin A23187, chlorhexidine, clotrimazole, econazole, hydrocortisone, filipin, gliotoxin, gramicidin A, gramicidin C, ionomycin, lasalocid A, lononnycin A, monensin, narasin, nigericin, nisin, N-(6-aminohexyl)-5-chloro-1-naphthalenesulfonamide, sulfisoxazole, pyrimethamine, mafenide, nonactin, nystatin, phenazine, pimaricin, polymyxin B, DL-penicillamine, praziquantel, salinomycin, surfactin, and valinomycin; e) enzyme inhibitors including, but not limited to, (+)-usnic acid, (±)-miconazole, (S)-(+)-camptothecin, 1-deoxymannojirimycin, 2-heptyl-4-hydroxyquinoline N-oxide, cordycepin, antimycin, 1,10-phenanthroline, 6-diazo-5-oxo-L-norleucine, 8-quinolinol, antipain, ascomycin, azaserine, bafilomycin, cerulenin, chloroquine, cinoxacin, ciprofloxacin, mevastatin, concanamycin A, concanamycin C, coumermycin A1, L(+)-lactic acid, cyclosporin A, econazole, enrofloxacin, etoposide, flumequine, formycin A, furazolidone, fusaric acid, geldanamycin, gliotoxin, gramicidin A, gramicidin C, herbimycin A, indomethacin, irgasan, lomefloxacin, mycophenolic acid, myxothiazol, nalidixic acid, netropsin, niclosamide, N-(6-aminohexyl)-5-chloro-1-naphthalenesulfonamide, N-methyl-1-deoxynojirimycin, nikkomycin, nogalamycin, nonactin, novobiocin, ofloxacin, oleandomycin, oligomycin, oxolinic acid, piericidin A, pipemidic acid, radicicol, rapamycin, rebeccamycin, sinefungin, staurosporine, stigmatellin, succinylsulfathiazole, succinylsulfathiazole, sulfadiazine, sulfadimethoxine, sulfaguanidine, sulfamethazine, sulfamonomethoxine, sulfanilamide, sulfaquinoxaline, sulfasalazine, sulfathiazole, triacsin C, trimethoprim, and vineomycin A1; f) membrane modifiers including, but not limited to, paracelsin); g) aminoglycosides; and h) fluoroquinolones.

The amount of compound to be administered may be that amount which is therapeutically effective. The dosage to be administered may depend on the characteristics of the subject being treated, e.g., the particular animal treated, age, weight, health, types of concurrent treatment, if any, and frequency of treatments, and on the nature and extent of the myopia, and can be easily determined by one skilled in the art (e.g., by the clinician). The selection of the specific dose regimen can be selected or adjusted or titrated by the clinician according to methods known to the clinician to obtain the desired clinical response. In addition, in vitro or in vivo assays may optionally be employed to help identify optimal dosage ranges. The precise dose to be employed in the compositions may also depend on the route of administration, and should be decided according to the judgment of the practitioner and each patient's circumstances.

The pharmaceutical compositions can be in unit dosage form. In such form, the composition can be divided into unit doses containing appropriate quantities of the active component. The unit dosage form can be a packaged preparation, the package containing discrete quantities of the preparations in vials or ampules.

One or more ophthalmic lubricating agents can also be included optionally in the compositions to promote lacrimation or as a "dry eye" medication. Such agents include, but are not limited to, polyvinyl alcohol, methylcellulose, hydroxypropyl methylcellulose, polyvinylpyrrolidone, and the like. It will be understood that promotion of lacrimation is beneficial in the present invention only where lacrimation is naturally deficient, to restore a normal degree of secretion of lacrimal fluid. Where excessive lacrimation occurs, residence time of the composition in the eye can be reduced.

The present disclosure also provides pharmaceutical packs or kits comprising one or more containers filled with one or more compounds or compositions described herein. Optionally associated with such container(s) can be a notice in the form prescribed by a governmental agency regulating the manufacture, use or sale of pharmaceuticals or biological products, which notice reflects approval by the agency of manufacture, use or sale for human administration for treating myopia described herein. In some embodiments, the kit contains more than one compound or composition described herein.

The present disclosure also provides methods of treating a subject having myopia or preventing a subject from developing myopia, the methods comprising administering to the subject any of the aqueous pharmaceutical solutions comprising benzyl atropine described herein to an eye. The present disclosure also provides methods of treating a subject having myopia or preventing a subject from developing myopia, the methods comprising administering to the subject any of the aqueous pharmaceutical solutions described herein to an eye.

In some embodiments, the administration is to a single eye of a subject. In some embodiments, the administration is to both eyes of a subject.

In some embodiments, the aqueous pharmaceutical solutions exhibit increased bioavailability. In some embodiments, the bioavailability comprises corneal bioavailability, conjunctival bioavailability, or ocular bioavailability.

In some embodiments, the aqueous pharmaceutical solutions can be administered to the eye in the form of an eye drop.

In some embodiments, the aqueous pharmaceutical solutions are administered topically to one or more tissues of the eye. Frequency of administration is typically such that the dosing interval, for example, the period of time between one dose and the next, during waking hours is from about 2 to about 12 hours, from about 3 to about 8 hours, or from about 4 to about 6 hours. It will be understood by those of skill in the art that an appropriate dosing interval is dependent to some degree on the length of time for which the selected composition is capable of maintaining a desired concentration of the aqueous pharmaceutical solution in the lacrimal fluid and/or in the target tissue (e.g., the conjunctiva or cornea).

The present disclosure also provides use of any of the aqueous pharmaceutical solutions described herein for treating a subject having an ocular condition or preventing a subject from developing an ocular condition. The present disclosure also provides use of any of the aqueous pharmaceutical solutions and lacking a preservative described herein for treating a subject having an ocular condition or preventing a subject from developing an ocular condition. The present disclosure also provides use of any of the aqueous pharmaceutical solutions described herein in the manufacture of a medicament for treating a subject having an ocular condition or preventing a subject from developing an ocular condition. The present disclosure also provides use of any of the aqueous pharmaceutical solutions and lacking a preservative described herein in the manufacture of a medicament for treating a subject having an ocular condition or preventing a subject from developing an ocular condition. In some embodiments, the ocular condition is myopia.

In order that the subject matter disclosed herein may be more efficiently understood, examples are provided below. It should be understood that these examples are for illustrative purposes only and are not to be construed as limiting the claimed subject matter in any manner.

EXAMPLES

Example 1: Identification of Benzyl Atropine as a Lead Compound

The higher doses of atropine required to prevent myopia are associated with debilitating side effects including pupillary dilation and light sensitivity (ATOM1, ATOM2, and LAMP studies). Moreover, it is well known that atropine decomposes in aqueous solutions into tropine and tropic acid:

Degradation Pathway A: Intermolecular Aqueous Hydrolysis

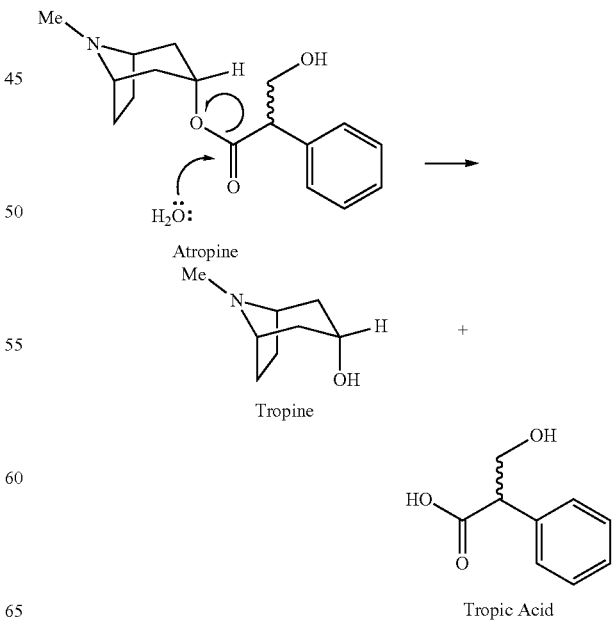

Degradation Pathway B: Intermolecular Cyclizadon Followed by Aqueous Hydroysis

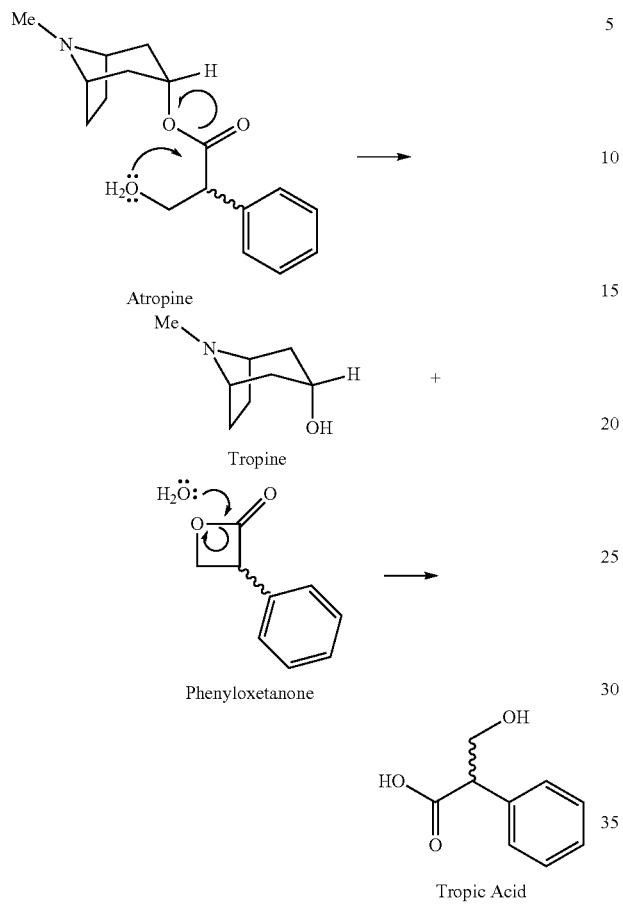

An issue with atropine's instability results in part from the lack of a substitution at the α position. In an attempt to avoid this issue, substitutions at the a position of atropine were considered and tested in a FDM chick model. Briefly, monocular form deprivation myopia (FDM) was induced in the right eye of chickens with the use of a translucent diffuser goggle, while the contralateral left eye was left ungoggled to serve as the control eye (normal). Following inducement of myopia (day 2 and day 4), the right eye with the goggles was treated with an intravitreal injection of vehicle with or without the drug, while the left ungoggled eye was injected with saline. On day 5, refractive error of the eye was measured using a retinoscope. The animals were then euthanized, eyes extracted and the axial length measured using digital calipers. Methyl atropine, fluoro-atropine, and benzyl atropine were found to be effective in a FDM chick model (see, FIG. 1, Panel A). However, benzyl atropine was unexpectedly found to be as effective as atropine in the FDM chick model, but at approximately ten-fold lower concentration (see, FIG. 1, Panel B).

The binding coefficients for atropine, methyl atropine, and benzyl atropine for the M1, M2, M3, M4, and M5 muscarinic receptors were then determined (Table 1). In vitro pharmacology studies were conducted to determine the ability of the newly synthesized compounds (dose-response) to bind to the different muscarinic receptors via a radioligand displacement study utilizing a known radiolabeled receptor selective ligand as reference. The binding affinity (ki) of the synthesized compound can be determined from the IC50 and KD values.

TABLE 1

| Muscarinic Binding Ki (nM) | Atropine | Methyl Atropine | Benzyl Atropine |
|---|---|---|---|
| M1 | 1.2 | 3.4 | 830 |
| M2 | 1.9 | 7.8 | — |
| M3 | 0.82 | 2.4 | — |
| M4 | 0.31 | 1.2 | 600 |
| M5 | 0.45 | 2.2 | — |

While atropine and methyl atropine were found to have non-selective binding to the muscarinic receptors, benzyl atropine was unexpectedly found to bind weakly to the M1 and M4 receptors but not to bind at all to the M2, M3, and M5 receptors. The lack of M3 receptor binding in particular suggested an opportunity to circumvent the side effects associated with native atropine. Therefore, benzyl atropine was identified as a lead candidate.

Example 2: Solubility of Atropine, Methyl Atropine, and Benzyl Atropine

As part of the initial formulation development approach, atropine, methyl atropine, and benzyl atropine were screened in two simple vehicles: 30 mM phosphate buffer, pH 7.4, and phosphate-buffered saline, pH 7.4, to evaluate their solubility profile. Five minutes of vortexing was used to provide the best possible conditions for solublization. It was expected that the solubility of atropine, methyl atropine, and benzyl atropine would be good in both vehicles and that the pH of both vehicles would be largely unchanged after the atropine, methyl atropine, and benzyl atropine were dissolved. The theoretical and actual concentrations of atropine, methyl atropine, and benzyl atropine in the resulting formulations are set forth in Table 2.

TABLE 2

| | Atropine | | Methyl Atropine | | Benzyl Atropine | |
|---|---|---|---|---|---|---|
| Vehicle | Theoretical (mg/g) | Actual (mg/g) | Theoretical (mg/g) | Actual (mg/g) | Theoretical (mg/g) | Actual (mg/g) |
| 30 mM Phosphate Buffer, pH 7.4 | 5.37 | 5.20 | 4.78 | 3.24 | 4.78 | 0.29 |
| Phosphate Buffered Saline | 4.74 | 4.89 | 5.16 | 1.63 | 5.28 | 0.30 |

While native atropine (i.e., atropine sulfate monohydrate), readily dissolved in both vehicle, methyl atropine and benzyl atropine unexpectedly did not entirely dissolve in either vehicle. Furthermore, methyl atropine and atropine unexpectedly contributed to an overall increase in pH of the formulations (Table 3).

TABLE 3

| Vehicle | Atropine | Methyl Atropine | Benzyl Atropine |
|---|---|---|---|
| 30 mM Phosphate Buffer, pH 7.4 | 7.5 | 9.2 | 7.9 |
| Phosphate Buffered Saline | 7.5 | 9.6 | 8.0 |

Therefore, lowering the initial pH value of the vehicles was deemed necessary to: i) ensure higher solubility; and ii) reach an ophthalmically-acceptable target pH (5-8). Also, the addition of tonicity agents was needed to reach the acceptable target range of 280-320 mOsm/kg (Table 4 and Table 5).

TABLE 4

Concentration of Methyl Atropine

| Vehicle | Theoretical (mg/g) | Actual (mg/g) |
|---|---|---|
| 3% Mannitol in 20 mM Phosphate Buffer, pH 4.8 | 5.73 | 5.62 |
| 0.45% Sodium Choride in 20 mM Phosphate Buffer, pH 4.8 | 5.12 | 5.14 |
| 3.7% Mannitol in 20 mM Phosphate Buffer, pH 2.82 | 5.15 | 5.14 |
| 0.5% Sodium Chloride in 20 mM Phosphate Buffer, pH 2.71 | 5.38 | 5.38 |

TABLE 5

Methyl Atropine, pH and Osmolality

| Vehicle | Starting pH | Final pH | Osmolality (mOsm/kg) |
|---|---|---|---|
| 3% Mannitol in 20 mM Phosphate Buffer, pH 4.8 | 4.8 | 8.8 | 217 |
| 0.45% Sodium Choride in 20 mM Phosphate Buffer, pH 4.8 | 4.6 | 8.0 | 182.5 |
| 3.7% Mannitol in 20 mM Phosphate Buffer, pH 2.82 | 2.8 | 6.8 | 262.5 |
| 0.5% Sodium Chloride in 20 mM Phosphate Buffer, pH 2.71 | 2.7 | 6.7 | 202.5 |

For methyl atropine, therefore, a 20 mM phosphate buffer with a starting pH of 2.7-2.8 produced a final pH close in the tolerable ideal range (pH 5 to 8) for ophthalmic products.

It was expected that lowering the pH of the vehicle would have resulted in the complete dissolution of the benzyl atropine as for methyl atropine. Unexpectedly, however, benzyl atropine did not fully dissolve upon pH adjustment (Table 6 and Table 7).

TABLE 6 pH Adjustment of Methyl Atropine and Benzyl Atropine Solutuions

| | Methyl Atropine | | Benzyl Atropine | | |
|---|---|---|---|---|---|
| Vehicle | Initial | Final | Initial | Ph Adjustment | pH after incubation (24 hours) |
| 30 mM Phosphate Buffer, pH 7.4 | 8.1 | 3.7 | 7.7 | 5.9 | 6.23 |
| Phosphate Buffered Saline | 9.3 | 5.6 | 7.7 | 4.3 | 5.7 |

TABLE 7

HPLC Analysis of Methyl Atropine and Benzyl Atropine Solutions

| | Methyl Atropine | | Benzyl Atropine | |
|---|---|---|---|---|
| Vehicle | Theoretical (mg/g) | Actual (mg/g) | Theoretical (mg/g) | Actual (mg/g) |
| 30 mM Phosphate Buffer, pH 7.4 | 5.09 | 4.61 | 4.99 | 0.05 |
| Phosphate Buffered Saline | 4.88 | 4.89 | 5.09 | 0.04 |

Therefore, additional formulation components were needed to increase the solubility of benzyl atropine. Initially, single excipients were evaluated (Table 8).

TABLE 8

Solubility of Benzyl Atropine in Surfactants

| Surfactant/Mixture | Theoretical Concentration (mg/g) | Actual Concentration (mg/g) |
|---|---|---|
| PEG-400 (neat) | 106.77 | 8.01 |
| Propylene Glycol (neat) | 115.18 | 6.96 |
| Polypropylene Glycol (neat) | 115.18 | 7.86 |
| 50% Propylene Glycol in 30 mM Phosphate Buffer, pH 7.4 | 116.35 | 1.85 |

Polyethylene glycol 400 (PEG-400), used as a "neat" solution, provided the highest drug solubility of 8.01 mg/g (0.8%). However, a recommended concentration of PEG-400 as an inactive ingredient in the final drug product is 5%. Neat propylene glycol and polypropylene glycol presented similar issues. Indeed, dilution of polypropylene glycol from 100% v/v to 50% v/v resulted in a considerable decrease in benzyl atropine concentration.

Additional individual excipients were then assessed for their ability to solubilize benzyl atropine in different buffers (Table 9).

TABLE 9

Concentration of Benzyl Atropine in Surfactant Mixtures

| Formulation | Theoretical Concentration (mg/g) | Actual Concentration (mg/g) | pH after API Dissolution | Adjusted pH |
|---|---|---|---|---|
| 7.0% PEG0-40 Stearate in Phosphate Buffer, pH 3.0 | 6.27 | 0.47 | 7.4 | 3.4 |
| 5.0% PEG-35 Castor Oil in Phosphate Buffer, pH 2.8 | 6.18 | 0.68 | 7.3 | 6.4 |
| 4.0% Tween 80 in Phosphate Buffer, pH 2.9 | 6.12 | 0.58 | 7.3 | 6.3 |
| 0.3% Tyloxapol in Phosphate Buffer, pH 2.8 | 6.27 | 0.19 | 7.3 | 5.2 |
| 2.0% Poloxamer 407 in Phosphate Buffer, pH 2.8 | 6.12 | 0.20 | 7.4 | 6.3 |
| 5.0% PEG-35 Castor Oil in Acetic Acid Buffer, pH 2.8 | 5.94 | 1.16 | 3.1 | N/A |
| 20% DMSO in Phosphate Buffer, pH 2.7 | 46.31 | 0.30 | 8.1 | N/A |
| 50% Glycerol in Phosphate Buffer in Phosphate Buffer, pH 2.5 | 47.43 | 0.84 | 7.6 | N/A |
| 50% Propylene Glycol in Phosphate Buffer, pH 2.9 | 46.96 | 1.56 | 8.3 | N/A |

As shown in Table 9, there was a two-fold increase in solubility with a change in the buffering vehicle (5% PEG-35 castor oil in phosphate buffer, pH 2.8 vs. 5% PEG-35 castor oil in acetic acid buffer, pH 2.8).

These excipients were also tested for their ability to solubilize benzyl atropine in the presence of citrate or acetate buffers (Table 10).

TABLE 10

Solubilizing Mixtures with Citrate and Acetate Buffers

| Formulation (pH before API addition) | Theoretical Conc. (mg/g) | Actual Conc. (mg/g) | Final pH |
|---|---|---|---|
| 20 mM Citrate Buffer, Surfactant Formulation, pH 3.0* | 6.13 | 5.73 | 4.4 |
| 20 mM Citrate Buffer, Surfactant Formulation, pH 4.65* | 5.32 | 2.38 | 5.8 |
| 30 mM Acetate Buffer, Surfactant Formulation, pH 4.38** | 5.60 | 5.49 | 4.9 |
| 30 mM Acetate Buffer, Surfactant Formulation, pH 4.56** | 5.42 | 5.42 | 5.5 |
| 30 mM Acetate Buffer, Surfactant Formulation, pH 5.11* | 5.22 | 3.59 | 7.7 |

*Formulation: 7.0% PEG-40 Stearate, 5.0% PEG-35 Castor Oil, 5.0% PEG-400
**Formulation: 7.0% PEG-40 Stearate, 5.0% PEG-35 Castor Oil, 3.5% PEG-400

However, even the change to citrate and acetate buffers did not immediately balance, on the one hand, the need for high benzyl atropine concentrations and, on the other, a drug product with an opthalmamically-acceptable pH. In the citrate buffer, for example, the concentration of the benzyl atropine was increased when the starting pH was lower. However, the pH of the resulting drug product was also lower at 4.4, which would likely be irritating to the eye upon instillation (Table 10, row 1). In contrast, when the starting pH was higher, the concentration of benzyl atropine was lower (row 2). In the acetate buffer and with a lower starting pH, the resultant solutions frequently did not have ophthalmically-acceptable pHs of greater than 5 (row 3; cf. row 1). Yet when the starting pH was higher, the concentration of the benzyl atropine was found to be lower (row 5, cf. row 2). After considerable effort far beyond merely routine optimization, an acceptable starting pH was found to be between 4.5-4.6 for the 30 mM acetate buffer/surfactant mixture (row 4). Through stability assessment, a 5 mg/g concentration for benzyl atropine was identified as being close to the compound's saturated solubility limit as the compound crashed out of solution over storage.

Considerable efforts were made to simplify the formulation to reduce the overall amount of surfactants (Table 11).

TABLE 11

Concentration of Benzyl Atropine in Freshly Prepared Formulations

| Vehicle Formulation (pH before API dissolution) | Theoretical Concentration (mg/g) | Actual Concentration (mg/g) | Final pH | Final Osmolality (mOsm/kg)) |
|---|---|---|---|---|
| 0.78% Sodium Chloride in 30 mM Acetate Buffer, pH 4.55 | 5.32 | 0.92 | 7.2 | 263.5 |
| 3.5% PEG-400, 0.46% Sodium Chloride in 30 mM Acetate Buffer, pH 4.62 | 4.93 | 1.79 | 7.1 | 287 |
| 7.0% PEG-40 Stearate, 0.58% Sodium Chloride in 30 mM Acetate Buffer, pH 4.64 | 5.53 | 4.62 | 7.4 | 264.5 |
| 5.0% PEG-35 Castor Oil, 0.81% Sodium Chloride in 30 mM Acetate Buffer, pH 4.57 | 5.17 | 3.02 | 7.5 | 306.5 |

TABLE 11-continued

Concentration of Benzyl Atropine in Freshly Prepared Formulations

| Vehicle Formulation (pH before API dissolution) | Theoretical Concentration (mg/g) | Actual Concentration (mg/g) | Final pH | Final Osmolality (mOsm/kg)) |
|---|---|---|---|---|
| 3.5% PEG-400, 5.0% PEG-35 Castor Oil, 0.37% Sodium Chloride in 30 mM Acetate Buffer, pH 4.67 | 5.12 | 3.95 | 7.4 | 293 |
| 7.0% PEG-40 Stearate, 0.65% Sodium Chloride in 5 mM Phosphate Buffer/30 mM Acetate Buffer | 5.25 | 5.32 | 6.4 | 291 |

The highest initial concentration was achieved with 7% PEG-40 stearate (Table 11, row 3). The highest achievable concentration of benzyl atropine that did not re-precipitate was 3.9 mg/g in the presence of 3.5% PEG-400, 5% PEG-35 castor oil, and 0.37% NaCl (row 5). The combination of two different species of surfactant was unexpected. After extensive study, an acetate/phosphate buffering vehicle was found to produce the highest concentration of benzyl acetate and a drug product with the most ophthalmically-acceptable pH. The efficacy of this "double-buffered" vehicle was unexpected.

The physical stability of benzyl atropine in phosphate buffer was further evaluated using hydroxypropyl-beta-cyclodextrin (HPβCD) as a solublizer. It was unexpectedly found that 10% HPβCD was able to solubilize benzyl atropine effectively at concentrations close to the solubility limit (Table 12 and Table 13).

TABLE 12

Initial Evaluation of HPβCD as a Solubilizer for Benzyl Atropine

| Formulation | Starting Theoretical Concentration (mg/g) | Concentration Dissolved (mg/g) | Final pH |
|---|---|---|---|
| 2.5% HPβCD in 20 mM Phosphate Buffer, pH 3.1 | 4.38 | 3.53 | 7.1 |
| 5.0% HPβCD in 20 mM Phosphate Buffer, pH 3.1 | 4.35 | 4.16 | 7.0 |
| 10.0% HPβCD in 20 mM Phosphate Buffer, pH 3.1 | 4.51 | 4.51 | 7.1 |

TABLE 13

Initial Evaluation of HPβCD as a Solubilizer for Benzyl Atropine

| Formulation | Theoretical Concentration (mg/g) | Actual Concentration (mg/g) | Final pH | Osmolality (mOsm/kg) |
|---|---|---|---|---|
| 2.21% Mannitol, 10.0% HPβCD in 20 mM Phosphate Buffer, pH 3.1 | 5.19 | 5.23 | 5.7 | 299, 296 |
| 0.43% Sodium Chloride, 10.0% HPβCD in 20 mM Phosphate Buffer, pH 3.1 | 5.16 | 5.92 | 5.8 | 286, 286 |

Various modifications of the described subject matter, in addition to those described herein, will be apparent to those skilled in the art from the foregoing description. Such modifications are also intended to fall within the scope of the appended claims. Each reference (including, but not limited to, journal articles, U.S. and non-U.S. patents, patent application publications, international patent application publications, gene bank accession numbers, and the like) cited in the present application is incorporated herein by reference in its entirety.

What is claimed is:

1. An aqueous pharmaceutical solution comprising benzyl atropine of Formula I:

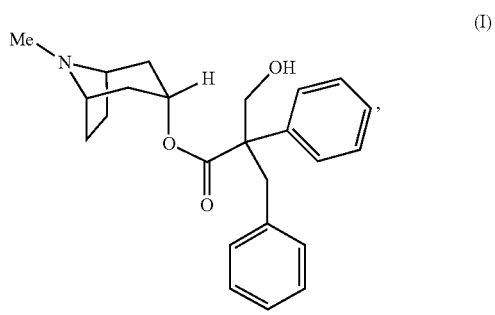 [SMILES: CN1C2CCC1CC(OC(=O)C(CO)(Cc1ccccc1)c1ccccc1)C2]

or a pharmaceutically acceptable salt or prodrug thereof, at least one buffer, at least one additional buffer, at least one tonicity agent, and at least one solubilizing agent, wherein the concentration of the benzyl atropine or a pharmaceutically acceptable salt or prodrug thereof is from about 0.01 to about 0.2% wt/wt, wherein the at least one buffer comprises at least one phosphate buffer and the at least one additional buffer comprises at least one acetate buffer, and wherein the at least one solubilizing agent comprises polyethylene glycol-400, polyethylene glycol-35/castor oil, polypropylene glycol, polysorbate-80, polyethylene glycol-40 stearate, poloxamer-407, dimethyl sulfoxide, or hydroxypropyl-β-cyclodextrin, or any combination thereof.

2. The aqueous pharmaceutical solution according to claim 1, wherein the at least one tonicity agent comprises sorbitol, propylene glycol, dextrose, glycerin, mannitol, potassium chloride, or sodium chloride, or any combination thereof.

3. The aqueous pharmaceutical solution according to claim 1, wherein the at least one solubilizing agent comprises hydroxypropyl-β-cyclodextrin and wherein the concentration of the hydroxypropyl-β-cyclodextrin is about 2.5, about 5, or about 10% wt/wt based on the total weight of the aqueous pharmaceutical solution.

4. The aqueous pharmaceutical solution according to claim 1, wherein the aqueous pharmaceutical solution comprises at least one additional solubilizing agent.

5. The aqueous pharmaceutical solution according to claim 1, wherein the aqueous pharmaceutical solution has a pH value from about 5 to about 8.

6. The aqueous pharmaceutical solution according to claim 1, wherein the aqueous pharmaceutical solution further comprises at least one preservative.

7. The aqueous pharmaceutical solution according to claim 1, wherein the aqueous pharmaceutical solution does not comprise a preservative.

8. The aqueous pharmaceutical solution according to claim 1, further comprising at least one additional solubilizing agent, wherein:
- the concentration of the benzyl atropine is from about 0.05 to about 0.2% wt/wt;
- the at least one buffer comprises at least one phosphate buffer;
- the at least one tonicity agent comprises sodium chloride;
- the at least one solubilizing agent comprises polyethylene glycol-400;
- the at least one additional buffer comprises at least one acetate buffer;
- the at least one additional solubilizing agent comprises polyethylene glycol-35; and
- the aqueous pharmaceutical solution has a pH value from about 5 to about 6.

9. The aqueous pharmaceutical solution according to claim 1, further comprising at least one additional solubilizing agent, wherein:
- the concentration of the benzyl atropine is from about 0.1 to about 0.15% wt/wt;
- the at least one buffer comprises at least one phosphate buffer;
- the at least one tonicity agent comprises sodium chloride;
- the at least one solubilizing agent comprises polyethylene glycol-400;
- the at least one additional buffer comprises at least one acetate buffer;
- the at least one additional solubilizing agent comprises polyethylene glycol-35; and
- the aqueous pharmaceutical solution has a pH value from about 6 to about 7.

10. A process of preparing an aqueous solution comprising benzyl atropine of Formula I:

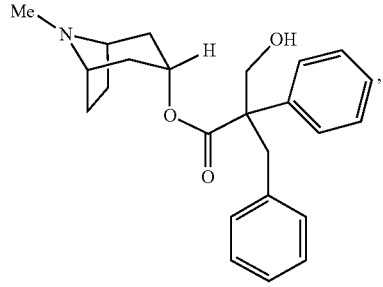

or a pharmaceutically acceptable salt or prodrug thereof, comprising:
- providing an aqueous solution comprising at least one acetate buffer and at least one phosphate buffer, at least one solubilizing agent, and at least one additional solubilizing agent, wherein the aqueous solution has a pH value from about 4 to about 5; and
- adding to the aqueous solution the benzyl atropine or a pharmaceutically acceptable salt or prodrug thereof, wherein the benzyl atropine or a pharmaceutically acceptable salt or prodrug thereof dissolves in the aqueous solution, thereby providing an aqueous solution of benzyl atropine or a pharmaceutically acceptable salt or prodrug thereof, and
- wherein the concentration of the benzyl atropine or a pharmaceutically acceptable salt or prodrug thereof in the aqueous solution is from about 0.01 to about 0.2% wt/wt and wherein the aqueous solution has a pH value of greater than about 5.

11. The product of the process of claim 10, wherein the aqueous solution of benzyl atropine is in the form of an aqueous pharmaceutical solution.

12. A method of treating myopia, or reducing myopia progression in a subject in need thereof, comprising administering to the eye of the subject a therapeutically effective amount of the aqueous pharmaceutical solution according to claim 1.

13. The method according to claim 12, wherein the aqueous pharmaceutical solution is administered every other day and wherein the concentration of the benzyl atropine or a pharmaceutically acceptable salt or prodrug thereof in the aqueous pharmaceutical solution is higher than that which would be necessary to treat myopia in the subject if the aqueous pharmaceutical solution was administered to the eye of the subject once a day.

* * * * *